Figure 1:
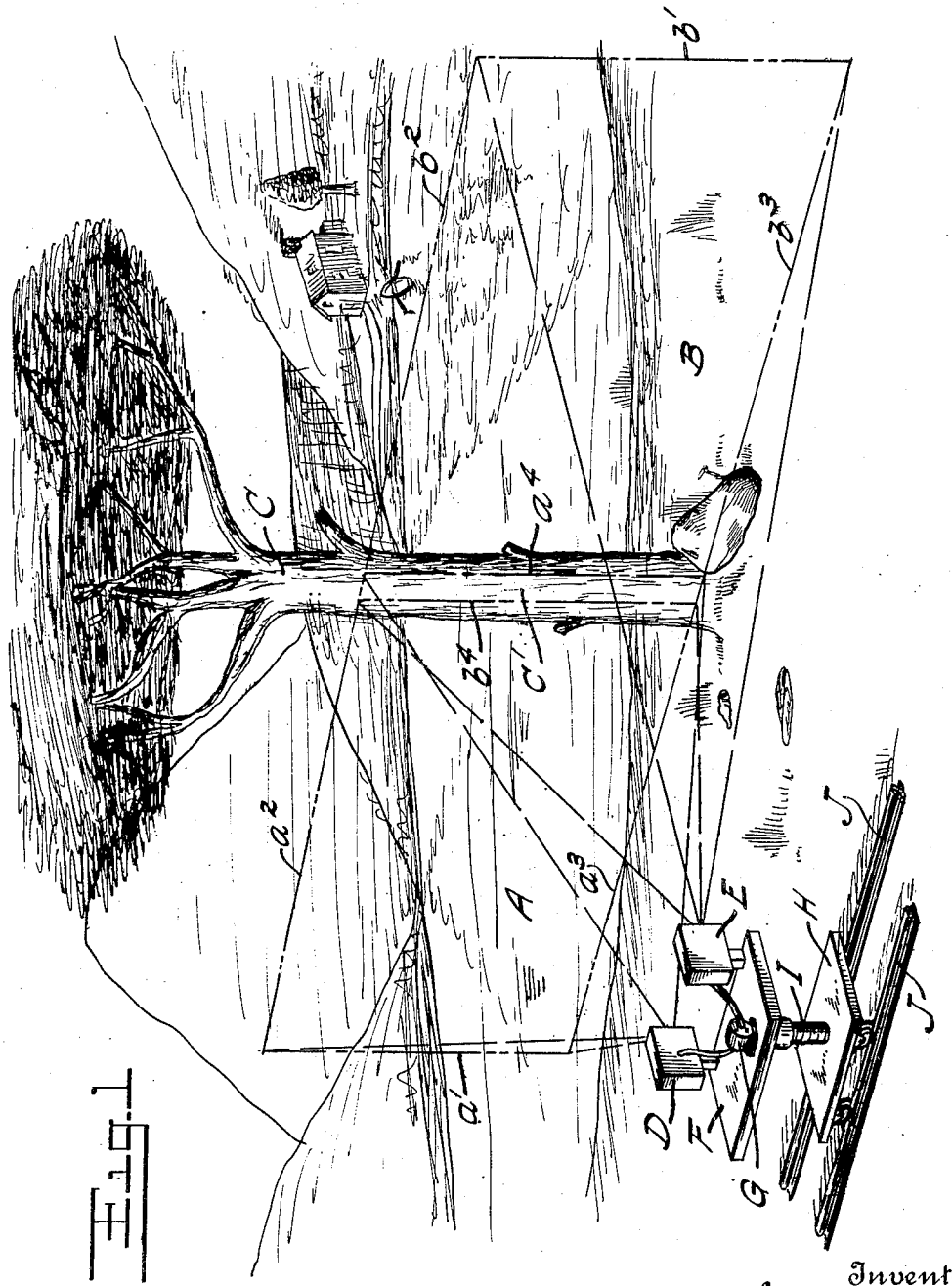

L. McCORMICK.
METHOD OF MAKING PHOTOGRAPHS.
APPLICATION FILED APR. 2, 1917.

1,294,686.

Patented Feb. 18, 1919.
3 SHEETS—SHEET 1.

Inventor
Langdon McCormick
By his Attorney H Van Dedeunel

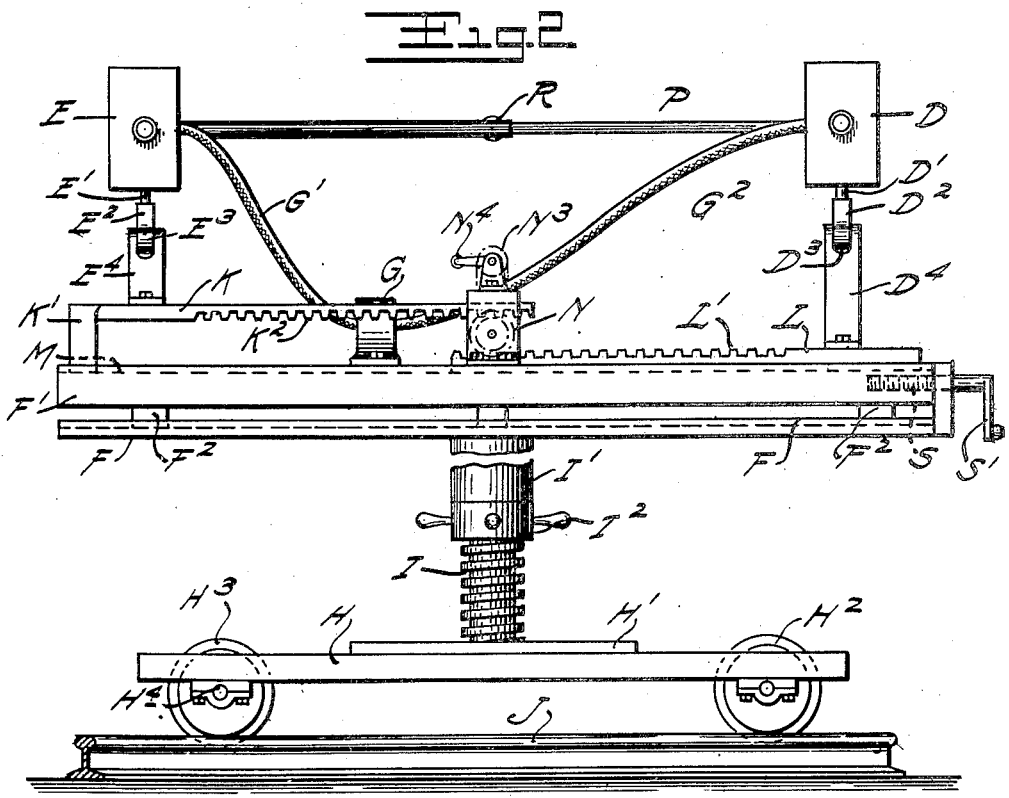

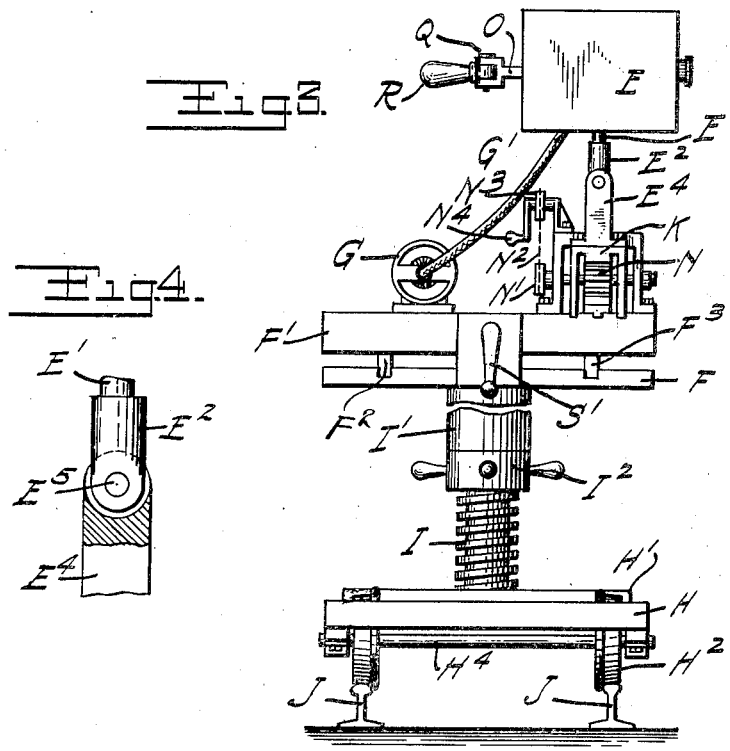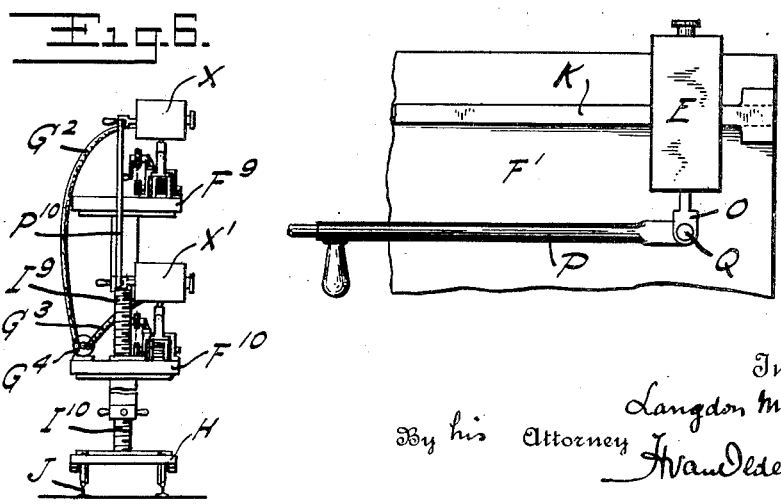

UNITED STATES PATENT OFFICE.

LANGDON McCORMICK, OF NEW YORK, N. Y.

METHOD OF MAKING PHOTOGRAPHS.

1,294,686.  Specification of Letters Patent.  Patented Feb. 18, 1919.

Application filed April 2, 1917. Serial No. 159,217.

*To all whom it may concern:*

Be it known that I, LANGDON McCORMICK, a citizen of the United States of America, residing in the borough of Manhattan, city and State of New York, have invented a new and useful Method of Making Photographs; and I do hereby declare the following to be a full, clear, and exact description of the same.

This invention relates to photography, for motion-picture reproduction, of adjacent fields of a scene or of adjacent portions of the same field of a scene.

One object of this invention is to separately and simultaneously, by the aid of suitable motion-picture cameras, photograph the adjacent fields or portions of a scene or scenery, and also to photograph a portion of a distinctive and intentional element or object, of considerable size, which divides the fields or portions one from the other, to the end that when the two resulting motion-pictures are simultaneously displayed upon a screen the representation of the divisional element or object will form part of each picture. As especially explained in my United States Patent 1,230,188 of June 19, 1917, the presence of a divisional picture element, or representation thereof, between two motion-pictures, when simultaneously projected on a screen, seemingly eliminates any flickering or relative movement that exists between the nearby edges of the two projected pictures.

Another object of my invention is to provide an apparatus, of novel construction, including a plurality of motion-picture cameras and means for simultaneously operating them, especially useful in taking a plurality of photographs simultaneously.

Referring to the accompanying drawings, Figure 1 illustrates one manner of practising the new method, and also, in a sketch form, illustrates an apparatus which is useful in the method; Fig. 2 illustrates, in front view, details of such an apparatus; Fig. 3 illustrates an end view of such apparatus; Fig. 4 illustrates details of a camera support; Fig. 5 illustrates, in plan, details of the camera swinging and shifting devices; Fig. 6 illustrates an end view of an apparatus having upper and lower motion-picture cameras.

Fig. 1 is intended to illustrate an outdoor natural scene, mountains and a stream being seen in the background and a tree being seen in the foreground. When the scene is viewed from the front (as illustrated), the tree is seen to constitute a natural and additional vertical element, of considerable size which divides the scene into two adjacent fields, a left-hand field and a right-hand field.

In the practice of my new method, I simultaneously photograph two such adjacent fields and include a portion of the considerable divisional object (tree, or whatever it may be) in each photograph.

As illustrated in Fig. 1, I use two motion-picture cameras (D and E), one of which will photograph a field (the left-hand field, A), and the other motion-picture camera making a photograph of a separate field (the right-hand field B). The two fields are divided by the aforesaid distinctive element or object, of considerable size which, in the instance illustrated, may be the vertical trunk of a tree, C. Each field will preferably, as shown, include a part, substantially a longitudinal half, of the element or object. As it is intended, principally, that the resulting motion-pictures are to be projected, side-by-side, upon a screen, and to there show as much as possible of the tree or other divisional vertical element or object, it is advisable that, during the taking of the photographs of the adjacent fields, each photograph shall show at least a longitudinal half of the element. In Fig. 1, I have shown each field slightly overlapping the other, this being exaggerated in the view so that it may certainly be seen. Thus the field A (of camera D) may be bounded by the dotted lines $a'$, $a^2$, $a^3$, $a^4$, while field B (of camera E) may be bounded by the dotted lines $b'$, $b^2$, $b^3$ and $b^4$.

The cameras are of any construction which admits the taking of consecutive-view, or so-called "motion" pictures, and both may be operated, in unison, and preferably at like speeds, by a motor G, which is mounted on a platform F. Such a platform may be raised and lowered by a screw I or other means, relatively to a car-body H which is movable along rails, J, or otherwise along a roadbed.

During the operations of the cameras, each will make photographs of any movements in its field. Subsequently, the so-made films, when simultaneously projected upon a screen, will reproduce the two fields in the original relation and the movements in both of all persons, animals or objects.

It will be understood, of course, that the cameras may be used to make motion-picture photographs of adjacent fields of painted, set or manufactured scenery, instead of a natural scenic view.

The apparatus outlined in Fig. 1 is shown in detail in the other figures.

Referring to Figs. 2, 3, 4 and 5, J represents rails along which a truck H is adapted to travel, by means of wheels $H^2$, $H^3$. Upon the truck, I have shown a plate, H′, which supports the lower end of a non-rotatable screw-shaft, I. Above said shaft there is a platform, F, which rests upon a sleeve I′, which is movable lengthwise of the screw-shaft and around the same, to permit the platform to be raised or lowered as desired, and also to be rotated (wholly or partly) around the axis of that shaft. It is thus possible to raise the cameras together to different heights, as well as to swing the platform and the cameras to any desired angle. The raising and lowering of the platform will be assured by rotation of a ring $I^2$ having handles and rotatively connected with the sleeve I′. As is well known the ring is provided with internal threads fitting those of the shaft I.

The platform F has a floor F′, slidably fitted thereon. As shown, the floor may have slides, $F^2$ and $F^3$, extending from the bottom and fitting longitudinal grooves ($F^4$) in the platform. In order to move the floor horizontally of the platform, I have shown a screw, S, which engages with the floor and is operated by a handle S′.

The shiftable floor F′ carries the cameras D and E, their supports, the motor G and connections for driving the cameras, the means whereby the operator swings the cameras in unison, and the connections for moving the cameras to and from each other.

Each motion picture camera is shown as secured by universal joints to slides which are movably fitted upon the floor F′. In detail, camera D is provided with a downwardly-projecting pin D′ which rotatively fits within a sleeve $D^2$, and the lower end of that sleeve is pivoted, at $D^3$, to swing, horizontally, upon a support $D^4$, which is secured to a slide L; camera E is provided with a downwardly-projecting pin E′ which rotatively fits a sleeve $E^3$, and the lower end of that sleeve is pivoted at $E^5$, to swing, horizontally, upon a support $E^4$, which is secured to a slide, K, the latter having a foot, K′, slidably fitting a groove M in the floor F′. The slides are provided with toothed racks, L′ and $K^2$, and these teeth are in engagement with those of a gear wheel, N. The latter is rotatably mounted in a bracket which is secured to the shiftable floor, F′.

Such wheel is driven by means of handle, $N^4$, sprocket, $N^3$, chain, $N^2$, and sprocket, N′, and, as a result, and depending upon the direction of movement of the handle, the cameras (D and E) will simultaneously be moved toward or away from one another.

As before stated, each camera is universally mounted upon its support, being mounted to swing (at $D^3$ or $E^3$) about a horizontal axis and also to swing (by pin D′ in socket of $D^2$, or by pin E′ in socket $E^2$) about a vertical pivot. Thus each camera may be adjusted at any desired angle. As before stated each may be raised or lowered with the platform F and floor F′.

In order to simultaneously operate the cameras, I have provided a motor, G, mounted on the floor F′, and have run a flexible shafting, G′, from the motor to both cameras.

It is desirable, of course, that, usually, the two cameras shall be shifted to exactly like positions. To assure this, I have provided means whereby an operator may, while standing on floor F′, simultaneously swing both cameras to any desired angle horizontally or vertically or horizontally and vertically. The illustrated means comprises a link rod, P, and this is pivotally connected with each camera, as at Q, with an arm O which extends rearwardly from the camera.

The cameras are disposed at about the same level, as shown in Figs. 1 and 2, or at different levels, as shown in Fig. 6 wherein the cameras X and X′ are carried, respectively, upon the upper and lower platforms $F^9$ and $F^{10}$. These upper and lower cameras are, in the form shown in Fig. 6, shifted by means of the link-rod $P^{10}$, and will be simultaneously operated by the motor $G^4$ and flexible shafting $G^2$, $G^3$. The two platforms will be raised or lowered together by means of the screw $I^{10}$, while the upper platform, $F^9$, may be raised or lowered independently, by means of screw $I^9$.

While I have herein shown and described details of apparatus, it is to be understood, of course, that my invention is not limited to such details, or even to such apparatus when carrying out my method.

What I claim is:—

1. In the photographing, for motion-picture reproduction, of a scene having an element of considerable size dividing the scene into adjacent fields, the method which consists in photographing one said field and part of the divisional element by means of a motion-picture camera, and also simultaneously photographing the other field and part of said divisional element by means of a motion-picture camera.

2. In the photographing, for motion-picture reproduction, of a scene having an element of considerable size in the foreground of and dividing the scene into adjacent fields, the method which consists in photographing one said field and part of the divisional element by means of a motion-picture camera, and also simultaneously photographing the other field and part of said divisional element by means of a motion-picture camera.

3. In the photographing, for motion-picture reproduction, of a scene having an upright element of considerable size in the foreground of and dividing the scene into a right hand field and a left-hand field, the method which consists in photographing the right-hand field and approximately one longitudinal half of said upright element by means of a motion picture camera and also simultaneously photographing the left-hand field and approximately the remainder of said element by means of a motion picture camera.

In testimony whereof, I have signed my name to this specification in the presence of two subscribing witnesses.

LANGDON McCORMICK.

Witnesses:
MARIE B. BERLER,
M. FOLEY.